United States Patent Office 2,702,801
Patented Feb. 22, 1955

2,702,801

CONVERSION OF SECONDARY NITRO COMPOUNDS TO AMIDES

Lorraine Guy Donaruma, Woodbury, and Melvin L. Huber, Pitman, N. J., assignors to E. I. du Pont de Nemours and Company, Wilmington, Del., a corporation of Delaware No Drawing. Application April 20, 1954, Serial No. 424,511

13 Claims. (Cl. 260—239.3)

The present invention relates to a process for the production of amides and lactams. More specifically, the present invention relates to a process whereby amides and lactams can be produced from water-soluble salts of secondary nitro compounds in a single reaction.

Lactams are used for the production of polyamides suitable for the manufacture of fabrics, films, fibers, coating compositions, and the like. Heretofore, the usual preparation of lactams has been by Beckmann rearrangement of ketoximes. Caprolactam, the most important member of this class, has long been prepared by rearrangement of cyclohexanone oxime. However, it has been necessary to prepare the cyclohexanone oxime intermediate by means of one or more reactions. For example, the preparation of the oxime by treating nitrocyclohexane or its salts with hydroxylamine, hydrogen, ammonia, amines, sulfides, olefins, alkylene oxides, and the like is well known in the art. It is also known to prepare cyclohexanone oxime by treatment of cyclohexanone with hydroxylamine, by treatment of cyclohexanone-bisulfite complexes with nitrous acid, and by like processes. Although such multi-step processes for the preparation of lactams have generally produced satisfactory products, the need has long been recognized for a process whereby lactams could be prepared in a single reaction.

An object of the present invention is to provide a process for the direct preparation of lactams. Another object of the present invention is to provide a process whereby lactams can be prepared in a single reaction. A still further object of the present invention is to provide an efficient process for converting water-soluble salts of secondary nitro compounds to the corresponding amides and lactams. Other objects will become apparent as the invention is further described.

We have found that the foregoing objects can be accomplished by adding a water-soluble salt of a secondary nitro alkane or nitro cycloalkane and a salt of hydrazoic acid to strong mineral acid mixed with an organic solvent.

In accordance with the process of the present invention, a water-soluble salt, e. g., an alkali metal or ammonium salt, of a secondary nitro alkane or nitro cycloalkane and an alkali metal salt of hydrazoic acid are added to a strong mineral acid, for example, concentrated sulfuric, hydrochloric, or phosphoric acid, mixed with an organic solvent, the temperature during the addition being maintained between the freezing point of water and the boiling point of hydrazoic acid.

The following examples serve to illustrate specific embodiments of the method of carrying out the present invention, but they will be understood to be illustrative only and not limiting the invention in any way.

*Example 1*

Seven parts of sodium azide was dissolved in a solution of the sodium salt of nitrocyclohexane prepared by dissolving 13 parts of nitrocyclohexane in 86 parts of water containing 4 parts of sodium hydroxide. The solution obtained was added slowly to a cold mixture (at about 5° C.) of 74 parts of chloroform and 180 parts of concentrated sulfuric acid, the rate of addition being so adjusted as to hold the temperature of the mixture between 25 and 35° C. After all of this solution had been added, the mixture was stirred at room temperature for one hour before it was neutralized by ammonia. Following neutralization, water was added to dissolve the precipitated salt, the chloroform layer was separated, and the aqueous phase was extracted with chloroform. The combined chloroform solution then was dried, the chloroform was removed by distillation, and the residue was distilled in vacuo. In this manner, 7 parts of caprolactam was obtained. This corresponds to a yield of 65%.

*Example 2*

Seven parts of sodium azide was dissolved in a solution of the sodium salt of 2-nitropropane prepared by dissolving 9 parts of 2-nitropropane in 50 parts of water containing 4 parts of sodium hydroxide. This salt solution then was added to a chilled mixture of 112 parts of chloroform and 180 parts of concentrated sulfuric acid, the rate of addition being so adjusted as to hold the temperature of the mixture between 25 and 35° C. After all of this solution had been added, the mixture was stirred at room temperature for a period of one hour before it was neutralized by ammonia. After the mixture had been neutralized, water was added to dissolve the precipitated salt, the chloroform layer was separated, and the aqueous layer was extracted with chloroform. The combined chloroform solution then was dried, and the chloroform was removed by distillation. The yield of N-methylacetamide distilled at 760 mm. Hg pressure was 3.2 parts, corresponding to a yield of 44%.

*Example 3*

Seven parts of sodium azide was dissolved in a solution of 15 parts of the ammonium salt of nitrocyclohexane in 85 parts of water, and the solution obtained was added to a cold mixture (at about 5° C.) of 66 parts of benzene and 180 parts of concentrated sulfuric acid at a rate such that the temperature of the mixture was held between 25 and 35° C. After all of the salt solution had been added, the mixture was agitated at room temperature for one hour before it was neutralized by ammonia. The neutralized mixture was worked up in the manner described in Example 1. Caprolactam was obtained in an amount of 5.9 parts, corresponding to a yield of 63%.

*Example 4*

Seven parts of sodium azide was added to a solution of sodium nitrocyclopentane prepared by the addition of 12 parts of nitrocyclopentane to 86 parts of water containing 4 parts of sodium hydroxide. The solution obtained was added to a chilled mixture of 74 parts of chloroform and 180 parts of concentrated sulfuric acid at a rate such that the temperature was held between 25 and 35° C. The total mixture was stirred for one hour at room temperature and then was neutralized with ammonia. The neutralized mixture was worked up as in the preceding examples to yield 8 parts of δ-valerolactam, which corresponded to a yield of 81%.

*Example 5*

Sodium azide was added in an amount of 7 parts to a solution of the sodium salt of nitrocyclohexane prepared by dissolving 13 parts of nitrocyclohexane in 100 parts of water containing 4 parts of sodium hydroxide. The solution obtained was added to a chilled mixture of 74 parts of chloroform and 112 parts of concentrated sulfuric acid, the rate of addition being so adjusted as to hold the temperature of the mixture between 5 and 30° C. The mixture was treated as in the foregoing examples, and 4.6 parts of caprolactam was obtained. This corresponded to a yield of 41%.

*Example 6*

To a solution of the sodium salt of nitrocyclohexane, prepared by the addition of 13 parts of nitrocyclohexane to 50 parts of water containing 4 parts of sodium hydroxide, was added 7 parts of sodium azide. The solution obtained was added to a chilled mixture of 74 parts of chloroform and 50 parts of concentrated sulfuric acid at a rate such that the temperature of the mixture was held between 25 and 35° C. The total mixture was worked up as in the previous examples. Caprolactam was obtained in an amount of 4.1 parts, corresponding to a yield of 41.6%.

Example 7

Seven parts of sodium azide was added to 15 parts of dry sodium nitrocyclohexane, and the salt mixture obtained was added to a chilled mixture of 50 parts of concentrated sulfuric acid and 74 parts of chloroform at a rate such that the temperature of the mixture was held between 25 and 35° C. The total mixture was treated in the manner described in the previous examples to yield 1.1 parts of caprolactam, which corresponded to a 10% yield.

Example 8

A dry sodium azide-sodium nitrocyclohexane mixture, prepared as in Example 7, was added to a chilled mixture of 74 parts of chloroform and 130 parts of concentrated hydrochloric acid, the rate of addition being so adjusted as to hold the temperature of the mixture between 25 and 35° C. The total mixture was treated according to the method described in the foregoing examples, and caprolactam was obtained in an amount of 3 parts, corresponding to a yield of 26.5%.

As the foregoing examples show, the highest yields are obtained in the process of the invention when the salt of the nitro compound is in the form of an aqueous solution, when the strong mineral acid employed is concentrated sulfuric acid, and when the temperature maintained during the addition of the mixture of the salt of the nitro compound and the salt of hydrazoic acid to the strong mineral acid is between 25 and 35° C. The examples likewise show that the molar ratio of the salt of hydrazoic acid to the salt of the nitro compound is preferably at least 1/1 and that greater than a stoichiometric equivalent of strong mineral acid to the salt of hydrazoic acid is preferably used.

The process of the present invention has been primarily applied in the examples to the preparation of lactams such as caprolactam and δ-valerolactam. However, the process is equally applicable to the production of amides such as N-methylacetamide from 2-nitropropane. Other nitro compounds of the group consisting of secondary nitro alkanes and nitro cycloalkanes, as for example, 2-nitrobutane and 3-nitropentane, can also be used as starting materials in the present process. The nitro compounds are employed in the form of their sodium and ammonium salts in the foregoing examples, but the process of the invention is not limited to the use of these salts; the other water-soluble alkali metal salts can be employed. The examples also indicate that benzene and chloroform are to be preferred as the solvents for the present process, but other organic, water-immiscible inert solvents, as for example, trichloroethylene, diethyl ether, and cyclohexane, can be used.

The invention has been described in detail in the foregoing. It will be understood that many variations can be introduced without departing from the scope of the invention. We intend, therefore, to be limited only by the following claims.

We claim:

1. A process for the conversion of a secondary nitro compound to the corresponding amide which comprises adding a water-soluble salt of a nitro compound selected from the group consisting of secondary nitro alkanes and nitro cycloalkanes and a salt of hydrazoic acid to a strong mineral acid selected from the group consisting of sulfuric acid, hydrochloric acid, and phosphoric acid mixed with an organic solvent.

2. The process described in claim 1, wherein the nitro compound is nitrocyclohexane.

3. The process described in claim 1, wherein the nitro compound is 2-nitropropane.

4. The process described in claim 1, wherein the nitro compound is nitrocyclopentane.

5. The process described in claim 1, wherein the water-soluble salt of the nitro compound is an alkali metal salt.

6. The process described in claim 1, wherein the water-soluble salt of the nitro compound is the ammonium salt.

7. The process as described in claim 1, wherein the salt of hydrazoic acid is an alkali metal salt.

8. The process described in claim 1, wherein the organic solvent is chloroform.

9. The process as described in claim 1, wherein the organic solvent is benzene.

10. A process for the conversion of a secondary nitro compound to the corresponding amide which comprises adding a water-soluble salt of a nitro compound selected from the group consisting of secondary nitro alkanes and nitro cycloalkanes and a salt of hydrazoic acid to a strong mineral acid selected from the group consisting of sulfuric acid, hydrochloric acid, and phosphoric acid mixed with an organic solvent, the temperature during said addition being maintained between the freezing point of water and the boiling point of hydrazoic acid.

11. The process as described in claim 10, wherein greater than a stoichiometric equivalent of mineral acid to the salt of hydrazoic acid is used.

12. The process as described in claim 10, wherein the mole ratio of the salt of hydrazoic acid to the salt of the nitro compound is at least 1/1.

13. The process as described in claim 10, wherein the water-soluble salt of the nitro compound is used in the form of an aqueous solution.

No references cited.